Patented Sept. 8, 1925.

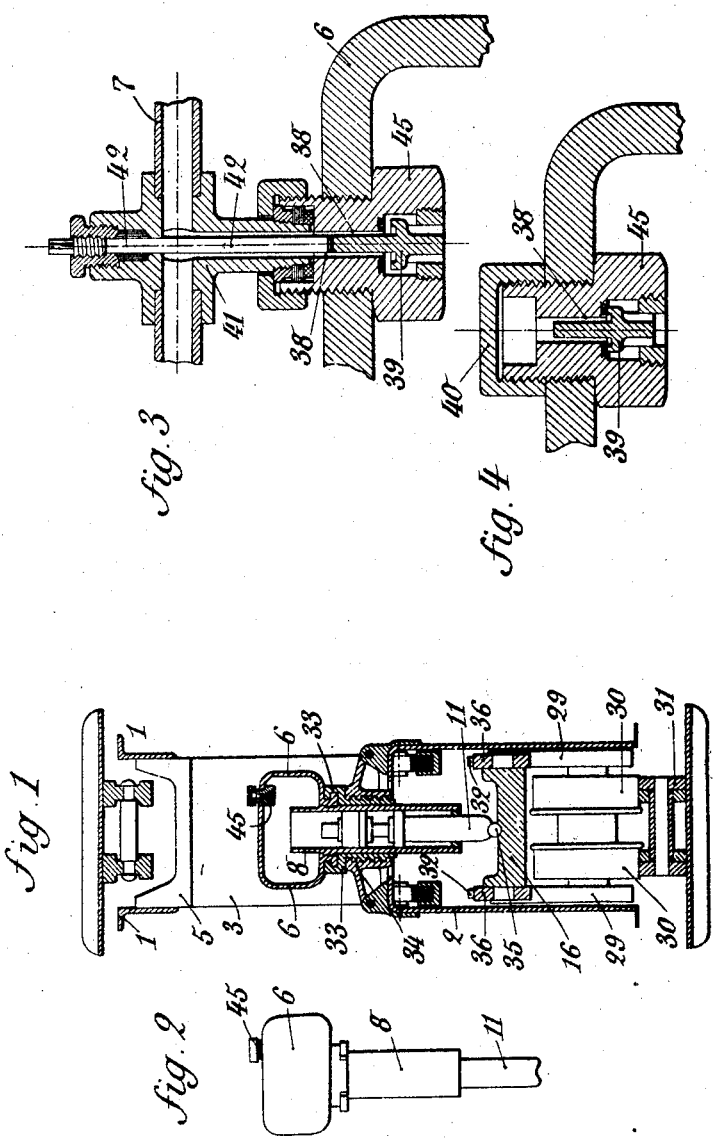

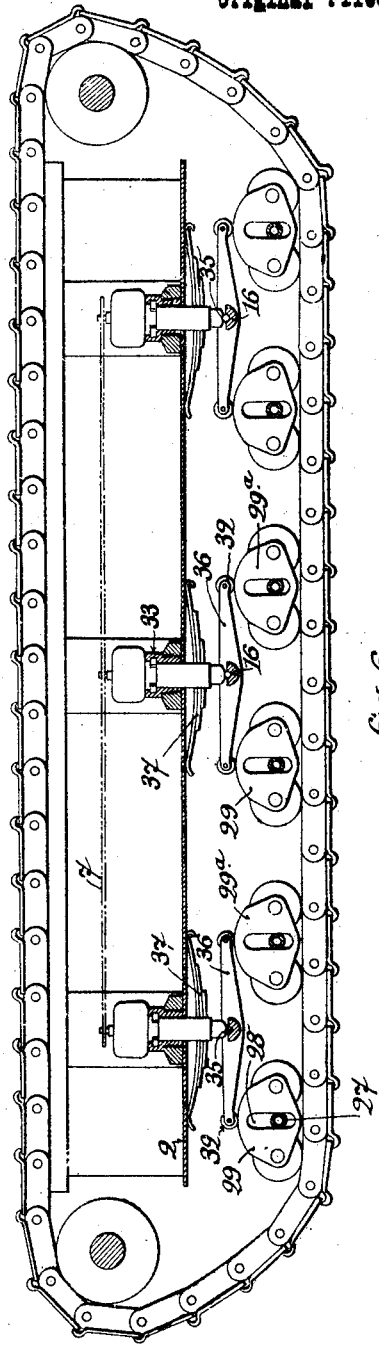

1,552,757

UNITED STATES PATENT OFFICE.

EMILE RIMAILHO, OF PARIS, FRANCE, ASSIGNOR TO COMPAGNIE DES FORGES & ACIERIES DE LA MARINE & D'HOMECOURT, OF PARIS, FRANCE.

SUSPENSION DEVICE FOR VEHICLES WITH TRAVELING TRACKS.

Original application filed January 31, 1923, Serial No. 616,192. Dividede and this application filed June 27, 1924. Serial No. 722,858.

*To all whom it may concern:*

Be it known that I, EMILE RIMAILHO, a citizen of the Republic of France, and residing at Paris, Seine Department, No. 12 Rue de la Rochefoucauld, France, have invented certain new and useful Improvements in Suspension Devices for Vehicles with Traveling Tracks, of which the following is a specification.

This application is a divisional of my pending application Serial No. 616,192 filed Jan. 31, 1923.

The present invention refers to vehicles with traveling tracks in which a suspension device comprising pneumatic jacks permits distribution of the load among the several carriages which bear upon these tracks, whatever the inequalities of the ground may be, and to thus considerably reduce the wear of the parts especially during fast running.

In the accompanying drawing:

Fig. 1 is a cross section of a traveling track device on the axis of one of the pneumatic jacks.

Fig. 2 is an elevational view of one of the pneumatic jacks removed.

Fig. 3 is a lengthwise section on the axis of the conduit of one of the pneumatic jacks, in the case in which the jacks are connected together.

Fig. 4 is a like section of the conduit of a separate jack.

Fig. 5 is an elevational side view, partly in section, of an endless track comprising three suspension pneumatic jacks insulated the one from the other.

Fig. 6 is a diagrammatic perspective view in which all the pneumatic jacks of both traveling track devices are connected together and to an air compressor driven by the engine.

Figs. 1 and 2 show a pneumatic jack composed of a cylinder 8 above which is a chamber 6 of larger diameter having extending therein the upper part of the cylinder which is united to said chamber, and also of a piston and its piston rod 11 which extends below the cylinder.

By the use of said chamber 6 of large diameter one can obtain a sufficient volume of air with a less space occupied in the vertical direction than if the cylinder 8 was extended to show the same volume.

The chamber 6 is provided with a filling and connecting conduit 45. A sleeve 33 is mounted upon the combined cylinder and chamber in a known manner, for example with a bayonet fitting, and it has an external screwthread so as to screw into a nut 34 on the frame of the traveling track device.

The bottom of each piston rod, Figs. 1 and 5, bears upon a ball 35 disposed within a cross-piece 16 journalled at the ends in two like rocker arms 36 which are independent of each other, on an axis passing through the centre of the said ball. The rocker arms have at each end the rollers 32 by which the said arms are caused to bear upon the traveling carriages 29.

The said carriages, which as stated are enabled to rise and also to be inclined in the lengthwise and the transverse direction, have their cheeks terminated at the top by contact edges $29^a$ which remain in contact with the grooved rollers 32 in all positions of the carriage. By the use of the rocker arms, only one-half the number of jacks are employed as are used in the arrangement shown in Figs. 1 to 3, and the flexibility of action of the traveling tracks is also augmented. The plate springs 37 mounted on the frame of the traveling track above each rocker arm will serve in case of insufficiency of a pneumatic jack, or should it be put out of use, to provide a temporary elastic suspension until the jack can be replaced.

In order to remove one of the pneumatic jacks, it is unscrewed by acting directly upon the screwthreaded sleeve 33 secured to the same. During this operation the piston rod 11 gradually moves out to the end of the stroke. When the unscrewing is carried out, this will entirely release the said jack. For the mounting of a jack, the reverse process is carried out, and one acts upon said sleeve in order to screw the jack into place. During the mounting and removal, the suspension jack will serve in a certain measure as an ordinary screw jack, and no other lifting device is required when replacing one of the jacks.

The conduit 45 Figs. 3 and 4, essentially comprises a duct 38 provided with a clack valve 39 for retaining the air; according as the jack is isolated or is connected with a conduit, the said conduit is closed, Fig. 4 by a screw plug 40, or it is extended, Fig. 3, by a union 41 connecting it with the conduit 7 and provided with a control rod 42 for maintaining said valve in the open position.

Fig. 5 shows in mixed lines a conduit 7 serving to connect together all the jacks of a given traveling track device; said conduit may be eliminated and the jacks can be made independent of each other, their side necks being closed by the plugs 40. The jacks may be connected together in groups according to any desired combination.

In Fig. 6 the jacks of both traveling track devices are all connected together and also to a compressor 43 driven by the engine 44.

Claims—

1. A suspension device for traveling tracks, comprising carriages bearing upon traveling tracks and vertically movable, movable pistons bearing upon the said carriages, cylinders having the said pistons slidable therein and adapted to receive a fluid under pressure acting upon the said pistons, the connection between the frame of the traveling track device and each suspension element being effected by means of a sleeve secured to said elements and screwed into a support which is attached to the frame.

2. A suspension device for traveling tracks, comprising carriages bearing upon the traveling tracks and vertically movable, movable pistons bearing upon said carriages, cylinders having the said pistons slidable therein and adapted to receive a fluid under pressure acting upon the said pistons, and a ball disposed between each piston and each carriage.

3. A suspension device for traveling tracks, comprising carriages bearing upon the traveling tracks and vertically movable, movable pistons bearing upon said carriages, cylinders having the said pistons slidable therein and adapted to receive a fluid under pressure acting upon the said pistons, every cylinder having thereupon a cylindrical chamber of larger diameter wherein the top of the said cylinder is adapted to enter, the said chamber being connected to the other cylinder and to a source of compressed air.

4. A suspension device for traveling tracks, comprising carriages bearing upon the traveling tracks and vertically movable, movable pistons bearing upon said carriages, cylinders having the said pistons slidable therein and adapted to receive a fluid under pressure acting upon the said pistons, and a cross-piece connecting two carriages together and serving as a support for the said piston.

In testimony that I claim the foregoing as my invention, I have signed my name.

EMILE RIMAILHO.